Sept. 21, 1926.  J. CLARKSON  1,600,215
LAND SCARIFIER
Filed Feb. 6, 1925   3 Sheets—Sheet 2

INVENTOR
JOHN CLARKSON
BY Harold D. Penney
HIS ATTORNEY

Sept. 21, 1926.	J. CLARKSON	1,600,215
LAND SCARIFIER
Filed Feb. 6, 1925	3 Sheets-Sheet 3

INVENTOR
JOHN CLARKSON
BY Harold D. Penney
HIS ATTORNEY

Patented Sept. 21, 1926.

1,600,215

UNITED STATES PATENT OFFICE.

JOHN CLARKSON, OF EWART, MANITOBA, CANADA.

LAND SCARIFIER.

Application filed February 6, 1925. Serial No. 7,277.

This present invention relates to improvements in tillage implements appertaining more particularly to a land scarifier that will cultivate, pulverize and destroy weeds.

The principal object is to provide an improved construction comprising a vehicular carriage and a rotatable toothed drum carried thereby on a tilting frame.

A further object is to provide such a scarifier that is motor driven either by an engine mounted on the vehicle itself, if horse drawn, or by a shaft or other transmission from the hauling tractor.

A still further object is to provide such a device of few parts and simple construction and one that is rendered commercially desirable by being capable of manufacture at a reasonable cost.

To the accomplishment of these and related objects, the invention resides in the construction, combination and arrangement of parts as shall be hereinafter more fully described, illustrated in the accompanying drawings and pointed out in the claims hereunto appended.

In the drawings, forming a part of this disclosure,

Figure 1:
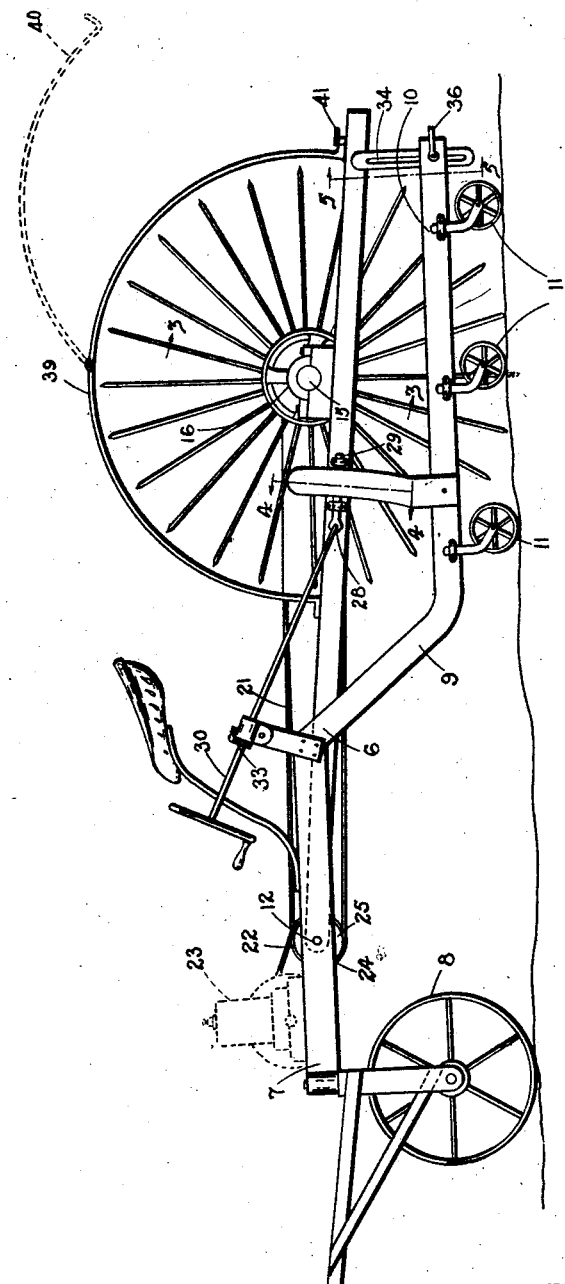
Fig. 1 is a side elevation of the preferred embodiment of my device.
Figure 2:
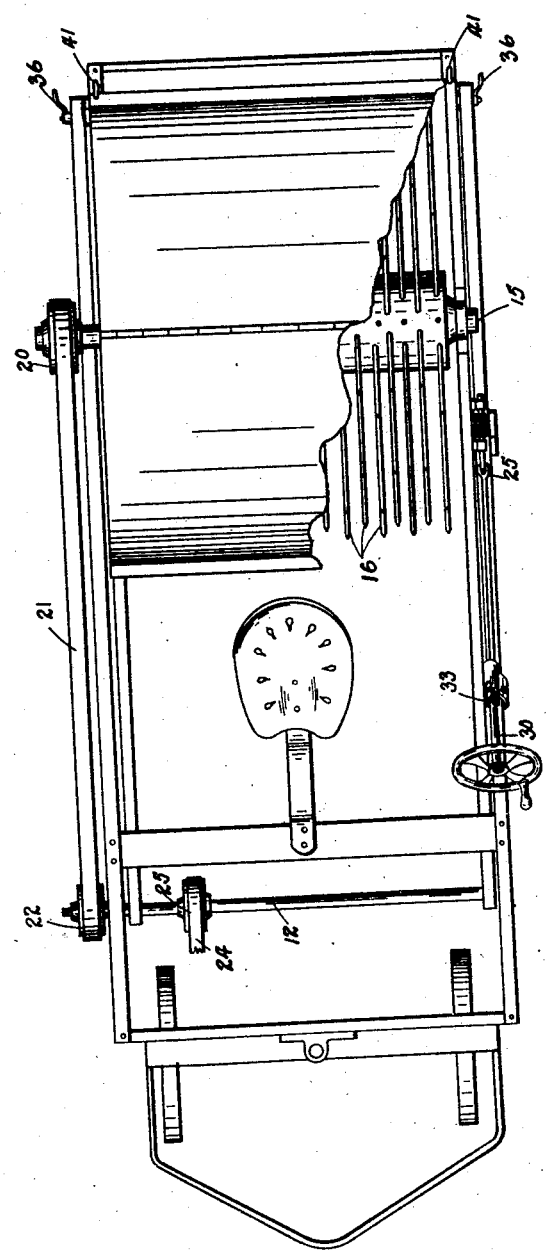
Fig. 2 is a plan view thereof.
Figure 3:
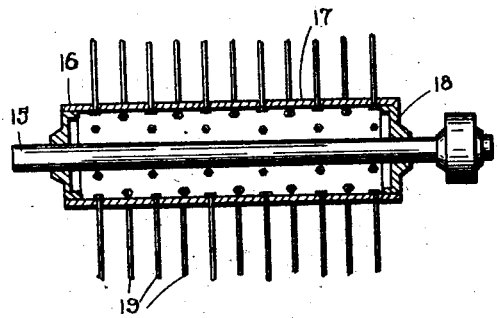
Figure 4:
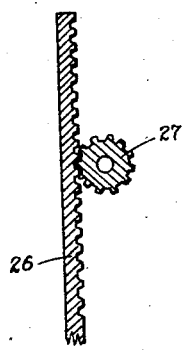
Figure 5:
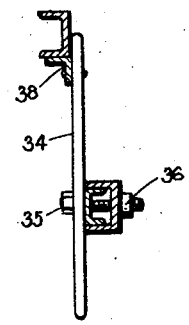

Figs. 3, 4 and 5 are sectional and fragmentary details taken on lines 3—3, 4—4 and 5—5, respectively, of Fig. 1.

Treated generally the device comprises an offset main frame, supported at the raised forward end by a conventional truck and carried at its offset lower rear end by a plurality of small trailer wheels on each side. A tilting carriage is horizontally pivoted at its forward end to the main frame, carrying at its rear a transverse drum with long radial soil scarifying tines. An upper guard for said toothed drum is provided and a manually operated means allows of the raising or lowering of the rear drum carrying end of the tilting carriage. The belt drive, for said drum, from a forward transverse shaft, propelled by a motor mounted on the main frame or by a drive from a hauling tractor, completes the device.

Referring particularly to the drawings wherein like characters indicate like parts in the several views, 6 is the main rectangular frame, the forward end 7 of which is mounted on the vertically pivoted truck 8. At 9 the frame 6 is offset and the rear end 10, supported by a plurality of small trailer wheels 11 on both sides, is raised but slightly from the ground.

A horizontal shaft 12 is rotatable in the main frame and on this a similarly constructed supplemental carriage 13 hinges. The rear of this tilting carriage supports the bearings 14 for a transverse shaft 15 of the drum 16 that comprises a hollow cylinder 17 with spider ends 18 keyed to the said shaft. Long, spring, soil engaging tines 19 are fixed to said cylinder and extend radially therefrom.

A wheel 20 is also keyed to an end of the shaft 15, exterior of the adjacent bearing and a belt 21 connects this with a wheel 22 on shaft 12 thereby connecting the shafts 12 and 15 and produces actuation of the latter on the driving of the former by power from the plant indicated at 23 or from a hauling tractor through the medium of a belt 24 on the wheel 25 keyed to the shaft 12 intermediate the side members of the supporting frame.

As the nature and condition of soils require varying treatment, adjustment of the tilting drum carrying carriage is provided for. A standard 26 is connected to the low rear end of the main frame and has a racked inner side with which a gear 27 on the tilting carriage 13 meshes. A universal joint 28 unites the shaft 29 carrying this gear with the manually operated crank-shaft 30 placed convenient for the operator, said crank shaft being supported by a hinged bearing 31 on a support 32 from the frame, and held against rotation by a dog 33.

A vertically movable post 34 is held to the inner side of the main frame adjacent the rear end by a bolt 35 and a handle nut 36, a slot 37, in the post, accomodating said bolt allows of its vertical adjustment. Proximate of the top of this post 34, an angle iron 38 projects inwardly therefrom and acts as a stop, adjustable by the movement of said post for the tilting carriage it is adapted to intercept.

To prevent the tines 19 from throwing soil or the like, a semicylindrical coverall guard 39 is provided for the drum and its tines, the rearmost half 40 of which is hinged to the fixed forward end. Fasteners 41 are provided to keep the hinged section normally in position yet allow of the opening thereof for cleaning or inspection.

From the foregoing description taken in connection with the accompanying drawings, it will be manifest that a land scarifier is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:

1. A land scarifier comprising a main carriage frame, a secondary frame hingedly supported thereby, a vertical standard secured to said main frame having its inner face in the form of a rack, a gear wheel, axially parallel with the line of draught, journalled laterally to said secondary frame and adapted to mesh with the racked part of said standard, manually operable means for rotating said gear wheel and a soil agitating element rotatably journalled transversely of said secondary frame.

2. A land scarifier comprising a main carriage frame supported at its forward end by a pivotal wheeled truck, offset at the rear and there supported by a plurality of small caster wheels on each side, a rotatable drive shaft journalled transversely of said frame near its forward end, a secondary frame hinging vertically thereon and extending rearwardly therefrom, a rotatable soil agitating element disposed transversely of said secondary frame and adapted for actuation by said drive shaft, manually operated means for vertically hinging said secondary frame, and a pair of vertically adjustable stop members mounted one on either side of said main frame near the rear thereof to support and steady said secondary frame in any desired vertical adjustment.

In testimony whereof I hereunto affix my signature.

JOHN CLARKSON.